June 8, 1965  K. K. PROBST  3,188,142
SEAT CONSTRUCTION
Filed July 30, 1962  3 Sheets-Sheet 3
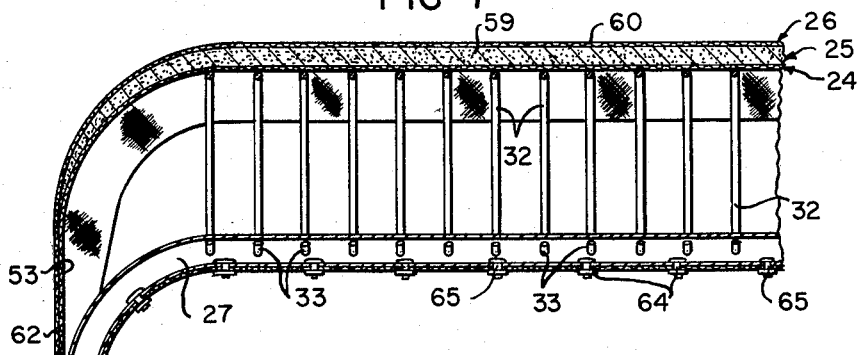
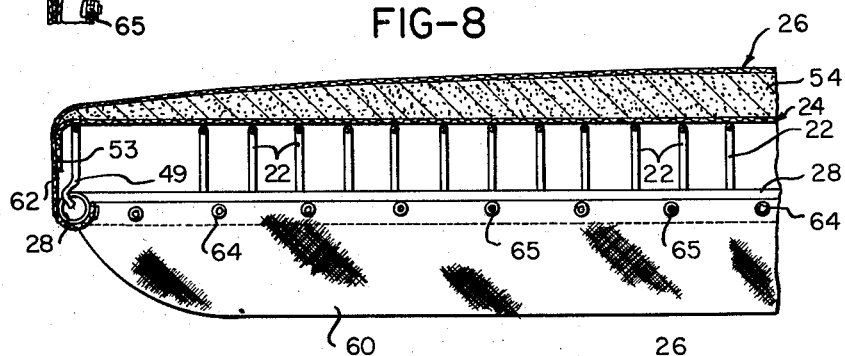
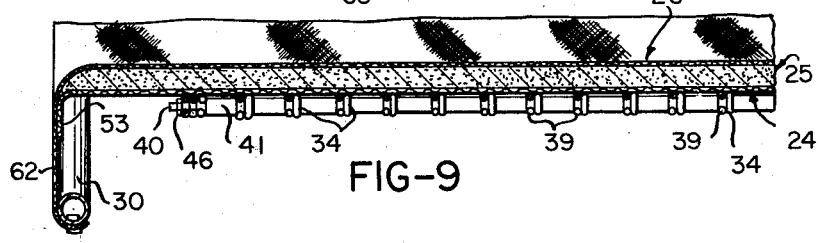
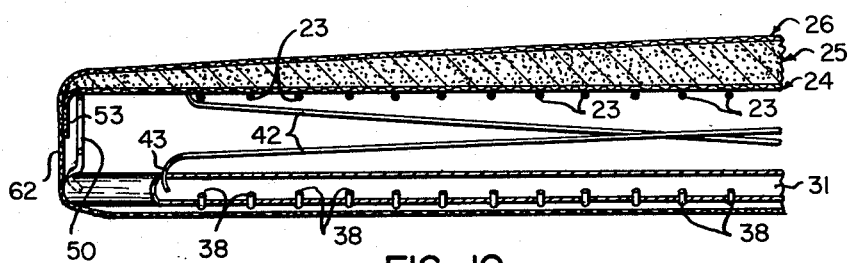
INVENTOR.
KARL K. PROBST
BY
*Cauden & Cauden*
HIS ATTORNEYS

United States Patent Office 3,188,142
Patented June 8, 1965

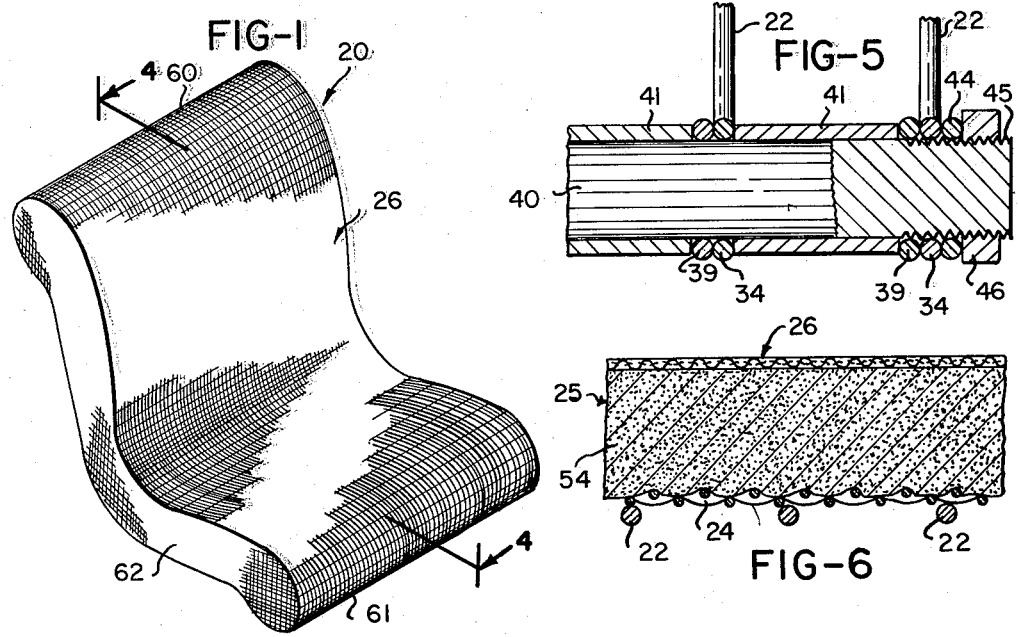
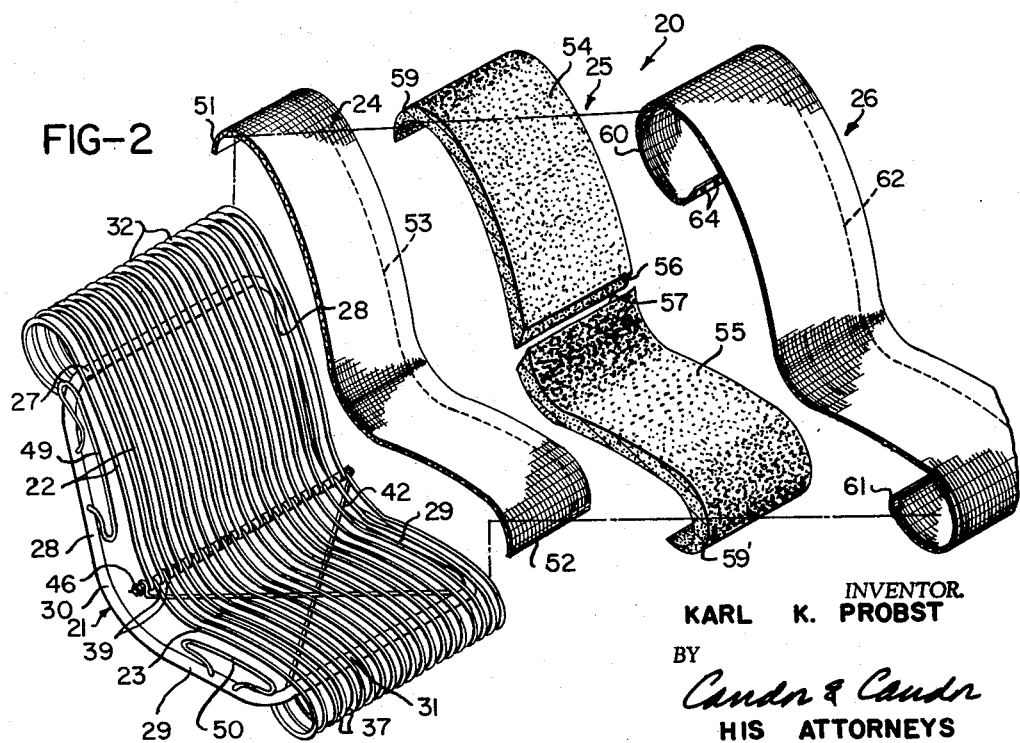

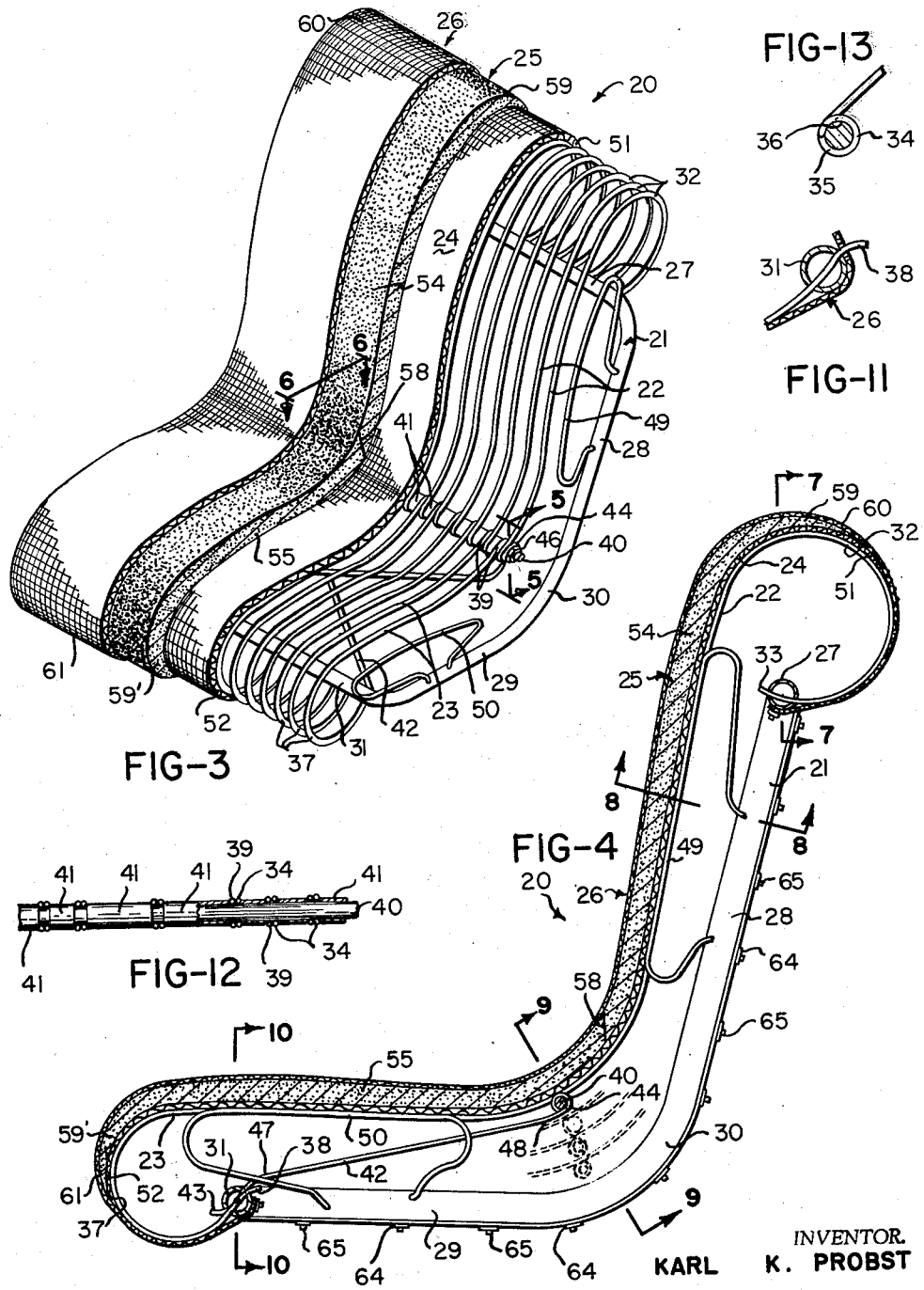

3,188,142
SEAT CONSTRUCTION
Karl K. Probst, Commodore Apt. 10–C, 522 Grand Ave., Dayton, Ohio; Jack P. Probst, executor of said Karl K. Probst, deceased
Filed July 30, 1962, Ser. No. 213,290
15 Claims. (Cl. 297—456)

This invention relates to an improved floating motion, self contouring, torsion coil seat construction or the like.

The seat construction of this invention incorporates various novel features to permit the back of the seat construction and the seat thereof to move in unison when a body of a person or the like is seated thereon to eliminate "back scrub" which would tend to pull the person's coat or shirt relative to his pants or the like if the seat portion moved independently of the back portion as in prior known seat constructions.

Further, the seat construction of this invention is so constructed and arranged that the same can be simply and easily fabricated from a relatively few parts to provide a fully contoured seat construction or the like having pleasing designs while being light in weight when compared to comparable seat constructions having the same comfort as the seat construction of this invention.

In one embodiment of the seat construction of this invention, a substantially rigid frame means is provided and has a top back portion and a front seat portion.

A plurality of back springs are provided and each has a torsion coil formed at one end thereof and secured to the top back portion of the frame means, each back spring having another end thereof disposed remote from the top back portion of the frame means.

A plurality of seat springs are provided and each has a torsion coil formed in one end thereof and secured to the front seat portion of the frame means, each seat spring having the other end thereof disposed remote from the front seat portion of the frame means.

The other ends of the back and seat springs are respectively joined or hinged to a transversely and substantially horizontally disposed rod or the like which is free to move or float relative to the frame means, the rod being located substantially at the juncture of the back portion of the seat construction with the seat portion thereof.

If desired, a plurality of looped springs can be respectively disposed at the back and seat side portions of the frame means, such looped springs having higher spring load rates than the main seat and back springs whereby the body load on side entering is supported and better "bucket seating" is secured in the seat and back portions of the seat construction of this invention.

If desired, the front and back springs can be suitably contoured to provide "bucket seating" or the like.

In order to prevent side sway and back sway of the seating surface of the seating construction of this invention, a pair of diagonal tie rods are respectively hinged to the ends of the horizontally disposed rod and are secured to the front seat portion of the frame means.

If desired, such diagonal tie rods can have a loop or loops provided therein to limit the deflection of the tie rods and seat back springs to minimize horizontal shocks of the seat construction.

A semi-hard wire mesh screen is suitably stamped to be disposed over the front and back springs to minimize "cut through" of the seat and back springs.

A suitable padding is disposed over the wire meshed screen and can comprise a single layer of material or can comprise separate material for the seat portion and back portion thereof as desired.

Thereafter, a fabric cover or the like is disposed over the padding and is secured to the frame means of the seat construction in any suitable manner.

If desired, the fabric cover or the like can be secured to the frame means in such a manner that the same preloads the seat and back springs and wire mesh screen of the seat construction.

This preloading is particularly useful when the seating construction is utilized in the vehicle field because such preloading of the seat and back springs and wire mesh provides greater riding deflections of the springs, slower oscillations thereof and, due to friction between the wire mesh screen, padding and cover, all rebounding is eliminated.

In addition, the preloading assures a wrinkle-free cover for the seat construction.

The cover for the seat construction of this invention can be a one-piece structure and can be adapted to snap on the back and seat spring ends or suitable screw pins in the frame means of the seat construction to permit the same to be readily replaced when desired.

For example, should the cover become soiled, cut, burned, or merely worn, the same can be readily replaced in a simple manner without the usual complication of upholstered seat constructions.

Further, the cover of the seat construction of this invention can comprise a single piece whereby the same is relatively simple and inexpensive to manufacture.

Therefore, it can be seen that the seat construction of this invention is relatively simple to manufacture as the same has a relatively few basic parts whereby the overall cost of the same is relatively small when compared to comparable seating constructions and whereby the seat construction of this invention is relatively light in weight when compared to comparable seat constructions.

Accordingly, it is an object of this invention to provide an improved seat construction having one or more of the novel features set forth above or hereinafter shown or described.

Other objects, uses and advantages of this invention are apparent from a reading of this description which proceeds with reference to the accompanying drawings forming a part thereof and wherein:

FIGURE 1 is a perspective view of the seat construction of this invention.

FIGURE 2 is an exploded, partial cross-sectional view illustrating various parts of the seat construction of this invention.

FIGURE 3 is a broken-away perspective view of the seat construction of this invention.

FIGURE 4 is an enlarged cross-sectional view of the seat construction illustrated in FIGURE 1 as taken on line 4—4 thereof.

FIGURE 5 is an enlarged, fragmentary, cross-sectional view taken on line 5—5 of FIGURE 3.

FIGURE 6 is an enlarged, fragmentary, cross-sectional view taken on line 6—6 of FIGURE 3.

FIGURE 7 is an enlarged, fragmentary, cross-sectional view taken on line 7—7 of FIGURE 4.

FIGURE 8 is an enlarged, fragmentary, cross-sectional view taken on line 8—8 of FIGURE 4.

FIGURE 9 is an enlarged, fragmentary, cross-sectional view taken on line 9—9 of FIGURE 4.

FIGURE 10 is an enlarged, fragmentary, cross-sectional view taken on line 10—10 of FIGURE 4.

FIGURE 11 is a fragmentary cross-sectional view illustrating another method of this invention for securing the cover member to the frame means of the seat construction.

FIGURE 12 is a fragmentary cross-sectional view similar to FIGURE 5 illustrating another embodiment of this invention.

FIGURE 13 is a fragmentary end view of one of the springs of this invention.

While the various features of this invention are hereinafter described as being particularly adaptable for forming a seat construction for vehicles or the like, it is to be understood that the various features of this invention can be utilized singly or in any combination thereof to provide other types of transportation seat constructions or stationary seat constructions, such as sofas, chairs and the like.

Therefore, this invention is not to be limited to only the embodiments illustrated in the drawings, because the drawings are merely utilized to illustrate one of the wide variety of uses of this invention.

Referring now to FIGURES 1-4, the improved seat construction of this invention is generally indicated by the reference numeral 20 and comprises a frame means 21, back springs 22, seat springs 23, wire mesh screening 24, padding means 25, and a cover means 26 assembled together in a manner hereinafter described.

As illustrated in FIGURES 2-4, the frame means 21 can comprise tubular metal stock suitably bent to define a substantially horizontally disposed top back portion 27 integrally joined to opposed and substantially vertically disposed back side portions 28 integrally joined to substantially horizontally disposed seat side portions 29 at arcuate portions 30, the side seat portions 29 of the frame means 21 being integrally joined to a substantially horizontally disposed front seat portion 31.

If desired, the frame means 21 can have the side portions 28 and 29 thereof suitably braced by substantially horizontally disposed bracing members (not shown) and the bent portions 30 thereof can be reinforced by disposing tubular lengths (not shown) over the same.

As illustrated in FIGURES 2-4, each back spring 22 has a torsion coil 32 formed at one end thereof and secured to the top back portion 27 of the frame means 21 by having the free end 33 thereof passing through suitable apertures formed in the top back portion 27 in the manner illustrated in FIGURE 4, the free end portion 33 being subsequently bent over or the like to anchor the respective back spring 22 to the frame means 21.

In order to prevent rotational movement of a respective back spring 22 about a horizontal axis relative to the top back portion 27 of the frame means 21, the end 33 thereof passes through apertures in the top back portion 27 at such an angle that the end portion 33 thereof is disposed at other than a horizontal direction to provide a movement arm between the spring 22 and the frame means 21 to resist rotational movement of the back spring 22 about a horizontal axis.

Each back spring 22 has the other end 34 thereof, FIGURE 13, looped to define an eyelet 35 having an opening 36 passing therethrough for a purpose hereinafter described.

If desired, each back spring 22 can be contoured in the manner illustrated in FIGURE 4 to provide a contoured seat construction 20 as illustrated in the drawings.

As illustrated in FIGURES 2-4, each seat spring 23 has a torsion coil 37 formed at one end thereof and secured to the front seat portion 31 of the frame means 21 by having the free end 38 thereof passing through suitable apertures formed in the front seat portion 31 of the frame means as illustrated in FIGURES 4 and 11.

To secure each seat spring 23 to the front seat portion 31 of the frame means 21, the free end 38 of the spring 23 can be suitably bent relative to the frame means 21 in the manner illustrated in FIGURE 11.

The other end 39 of each seat spring 23 is also provided with a looped end in the manner illustrated in FIGURE 13 to provide an eyelet having an opening passing therethrough.

In order to prevent rotational movement of the seat springs 23 about a horizontal axis, the end 38 of each spring 23 passes through the frame means at an angle to the horizontal to provide the aforementioned movement arm to resist rotational movement in the same manner as the back springs 22.

It is preferred that the springs 22 and 23 pass through the frame means 21 other than vertically to prevent weakening of the frame means 21.

The free ends 34 and 39 of the back springs 22 and seat springs 23 are respectively hinged to a horizontally disposed rod 40 passing through the openings in the eyelet thereof in the manner illustrated in FIGURES 4 and 5 whereby the back springs 22 and seat springs 23 are tied together.

The rod 40 is disposed substantially at the juncture of the back of the seat construction 20 with its seat portion thereof as fully illustrated in the drawings, the rod 40 being adapted to move in a free-floating manner relative to the frame means 21 for a purpose hereinafter described.

Each adjacent pair of back and seat springs 22 and 23 are spaced relative to the next adjacent pair thereof by spacer sleeves 41, as illustrated in FIGURE 5, disposed around the rod 40.

If it is desired to provide variable spacing between adjacent springs 22 or 23 to provide a more bucket seat effect, the spacers 41 can be variable in length in the manner illustrated in FIGURE 12 and the respective torsion coil ends 32 and 37 of the springs 22 and 23 can be attached to the respective frame portions 27 or 31 at different spacings in a like manner.

In order to prevent side sway and back sway of the seating surface of the seat construction 20 of this invention, a pair of diagonal tie rods 42 are provided and respectively have ends 43 secured to the opposed ends of the front seat portion 31 of the frame means 21 while passing through suitable apertures therein in the manner illustrated in FIGURE 4.

The other opposed ends 44 of the tie rods 42 are respectively provided with eyelet portions adapted to receive the opposite opposed ends of the rod 40 in the manner illustrated in the FIGURES 3 and 5.

If desired, the opposed ends of the rod 40 could be threaded at 45 to receive a nut 46 to not only hold the tie rods 42 in place, but to also stack the spacing means 41 and eyelet portions of the seat and back springs 23 and 22 on the rod 40.

In order to minimize horizontal road shocks that might be transmitted from the frame means 21 to the freely floating horizontal rod 40 through the tie rods 42, the tie rods 42 are provided with one or more loops therein, such as at 47 and 48, to provide limited deflection of the tie rods 42 to absorb the horizontal shocks.

A pair of looped springs 49 are respectively carried by the back side portions 28 of the frame means 21 and a pair of looped springs 50 are respectively carried by the seat side portions 29 of the frame means 21 to further enhance the effect of a bucket seat and to prevent the passenger's body from shifting due to centrifugal force on curves or the like.

For example, the looped springs 49 and 50 can have higher spring rates than the back and front and seat springs 22 and 23 to provide the above effects.

Therefore, it can be seen that the basic spring structure of the seat construction 20 of this invention can be formed in a relatively simple and rapid manner to the frame means 21 to provide a back and seat structure which will move together when the body of a person is seated thereon.

For example, see FIGURE 4 wherein the rod 40 is illustrated in full lines when no one is sitting on the seat construction 20 and is illustrated in various deflected portions in dotted lines as people of different weight sit on the seat construction 20.

In this manner, it can be seen that the rod 40 freely floats upwardly and downwardly carrying the springs 22 and 23 therewith as the springs 22 and 23 are respectively interconnected to the frame means 21 only at the torision coils 32 and 37 thereof.

The back springs 22 and seat springs 23 can be so constructed and arranged that the seat torsion coils 37 carry approximately 25% of the body weight and the back torsion coils 32 carry approximately 75% of the body weight.

Because the horizontal rod 40 moves downwardly in the manner illustrated in FIGURE 4, it can be seen that the back portion of the seat construction 20 moves downwardly at the same rate as the seat portion thereof whereby no "back scrub" is provided by the seat construction 20 of this invention.

The frame means 21 can be fastened to any supporting structure (not shown) to support the seat construction 20 the desired height above a supporting surface.

As illustrated in the drawings, a sheet of semi-hard wire mesh screen 24 of approximately one-half inch mesh is suitably stamped in a manner to have opposed top and bottom portions 51 and 52 thereof respectively disposed over the torsion coils 32 and 37 and has the opposed side edges 53 thereof adapted to fit around the looped springs 49 and 50 so that the wire mesh spring 24 can be placed directly on the skeletonized seat construction previously described to transmit the body load substantially evenly over the engaged springs 22 and 23 without having the springs 22 and 23 substantially cutting into the padding material 25 and cover material 26.

In this manner, the wire mesh screen 24 need not be directly secured to the frame means 21 as will be apparent hereinafter but can merely rest on the same.

The padding material 25 can comprise a one-piece formed structure or can comprise two pieces 54 and 55 of different materials to be untilized respectively for the back and seat of the seat construction 20.

For example, the back padding 54 can comprise one-inch Kapox padding and the seat padding 55 can comprise one-inch Air Foam padding or the like, the padding material 54 and 55 respectively having beveled ends 56 and 57 which will be in overlapping relation at a line 58 as illustrated in FIGURE 4.

The padding material 25 is merely placed on top of the wire mesh screen 24 and has ends 59' and 59 thereof respectively disposed over the formed ends 51 and 52 of the wire mesh screen 24 without being secured thereto as will be apparent hereinafter.

The cover material 26 can comprise a one-piece fabric or the like so shaped that the same has top and bottom portions 60 and 61 adapted to be disposed over the torsion coils 32 and 37 and has opposed side edges 62 adapted to be disposed against the frame means 21.

The cover 26 can be provided with a plurality of eyelets 64 around the perimeter thereof which are adapted to snap over outwardly projecting pin means 65, FIGURE 4, carried by the frame means 21 to detachably secure the cover 26 over the padding material 25 in the manner illustrated in FIGURE 4.

It is preferred that the cover material 26 is so constructed and arranged relative to the frame means 21 that the same must preload the padding material 25, wire mesh 24 and back and seat springs 22 and 23 approximately 0.5 of an inch to cause the wire mesh screen 24 and padding material 25 to be interlocked together by friction and by having the padding material 25 pushed through the mesh of the screening 24 in the manner illustrated in FIGURE 6 whereby there will be no relative movement between the cover material 26, padding 25, screen 24 and springs 22 and 23.

Further, it has been found that such preloading of the cover material 26 permits the cover material 26 to be relatively smooth and wrinkle-free, the preloading of the springs 22 and 23 by the cover material 26 also providing greater riding deflection of the springs 22 and 23, slower oscillation thereof and, due to friction between the screen 24, padding 25 and cover 26, all rebounding is eliminated.

While the cover material 26 has been illustrated and described as being secured over pin means 65 carried by the frame means 21, it is to be understood that the eyelets 64 thereof could be secured over the free ends 33 and 38 of the springs 22 and 23 in the manner illustrated in FIGURE 11 whereby the pin means 65 could be eliminated or partially eliminated as desired.

By making the cover material 26 detachable from the seat construction 20 of this invention, it can be seen that it is relatively simple to change the cover material 26 should the same become worn, burned, cut, or the like, such feature not being available in upholstered seating constructions or the like.

Therefore, it can be seen that this invention provides an improved seating construction wherein the back and seat portions thereof move in unison to prevent "back scrub" or the like and wherein the same can be contoured as desired to provide a bucket seat arrangement or wherein the same can provide a substantially straight seat construction.

Further, the seat construction of this invention is light in weight and relatively simple to manufacture.

While the form of the invention now preferred has been disclosed as required by the statutes, other forms may be used, all coming within the scope of the claims which follow.

What is claimed is:

1. A seat construction comprising a frame means having a top back portion and a front seat portion, a plurality of back springs each having a torsion coil secured to said top back portion, a plurality of seat springs each having a torson coil secured to said front seat portion, and a freely floating means hinged to said springs adjacent the juncture of the back of said seat construction to the seat thereof to permit relative movement between said springs and said freely floating means, said springs each being separately hinged to said floating means so as to move relative to said floating means independently of the remaining springs.

2. A seat construction comprising a frame means having a top back portion and a front seat portion interconnected together by side portions, a plurality of back springs each having a torsion coil secured to said top back portion, a plurality of seat springs each having a torsion coil secured to said front seat portion, a freely floating rod hinged to said springs adjacent the juncture of the back of said seat construction to the front thereof to permit relative movement between said springs and said rod, said springs each being separately hinged to said rod so as to move relative to said rod independently of the remaining springs, and a pair of looped springs respectively mounted in said side portions at the seat of said construction.

3. A seat construction comprising a frame means having a top back portion and a front seat portion interconnected together by side portions, a plurality of back springs each having a torsion coil secured to said top back portion, a plurality of seat springs each having a torsion coil secured to said front seat portion, a freely floating rod hinged to said springs adjacent the juncture of the back of said seat construction to the front thereof to permit relative movement between said springs and said rod, said springs each being separately hinged to said rod so as to move relative to said rod independently of the remaining springs, and a pair of looped springs respectively mounted in said side portions at the back of said construction.

4. A seat construction comprising a frame means having a top back portion and a front seat portion, a plurality of back springs each having a torsion coil secured to said top back portion, a plurality of seat springs each having a torsion coil secured to said front seat portion, a freely floating rod hinged to said springs adjacent the juncture of the back of said seat construction to the seat thereof to permit relative movement between said springs and said rod, said springs each being separately hinged to said rod so as to move relative to said rod independently of the remaining springs, and means interconnecting said frame means to said rod to prevent side sway thereof.

5. A seat construction comprising a frame means having a top back portion and a front seat portion, a plurality of back springs each having a torsion coil secured to said top back portion, a plurality of seat springs each having a torsion coil secured to said front seat portion, a freely floating rod hinged to said springs adjacent the juncture of the back of said seat construction to the seat thereof to permit relative movement between said springs and said rod, said springs each being separately hinged to said rod so as to move relative to said rod independently of the remaining springs, and tie rods connecting said frame means to said rod to prevent side sway thereof.

6. A seat construction comprising a frame means having a top back portion and a front seat portion, a plurality of back springs each having a torsion coil secured to said top back portion, a plurality of seat springs each having a torsion coil secured to said front seat portion, a freely floating rod hinged to said springs adjacent the juncture of the back of said seat construction to the seat thereof to permit relative movement between said springs and said rod, said springs each being separately hinged to said rod so as to move relative to said rod independently of the remaining springs, and a pair of diagonal tie rods respectively interconnected to said front seat portion and to the ends of said rod to prevent side sway thereof.

7. A seat construction as set forth in claim 6 wherein each tie rod has a loop therein to provide limited deflection thereof to absorb horizontal shocks.

8. A seat construction comprising a frame means having a top back portion and a front seat portion, a plurality of back springs each having a torsion coil secured to said top back portion and having a loop at its free end, a plurality of seat springs each having a torsion coil secured to said front seat portion and having a loop at its free end, and a freely floating rod passing through said loops of said springs to hinge the same together and to permit relative movement between said springs and said rod, said springs each being separately hinged to said rod so as to move relative to said rod independently of the remaining springs.

9. A seat construction as set forth in claim 8 wherein spacer means are carried by said rod and space said springs relative to each other.

10. A seat construction as set forth in claim 8 wherein said springs are variably spaced to provide a bucket seat effect.

11. A seat construction comprising a frame means having a top back portion and a front seat portion, a plurality of back springs each having a torsion coil secured to said top back portion and having an end portion remote therefrom, a plurality of seat springs each having a torsion coil secured to said front seat portion and having an end portion remote therefrom, a freely floating means hinged to said end portions of said springs to permit relative movement between said end portions and said floating means, said springs each being separately hinged to said floating means so as to move relative to said floating means independently of the remaining springs, and a wire mesh screen conforming to the shape of said seat construction and disposed over said springs.

12. A seat construction comprising a frame means having a top back portion and a front seat portion, a plurality of back springs each having a torsion coil secured to said top back portion and having an end portion remote therefrom, a plurality of seat springs each having a torsion coil secured to said front seat portion and having an end portion remote therefrom, a freely floating means hinged to said end portions of said springs to permit relative movement between said end portions and said floating means, a wire mesh screen conforming to the shape of said seat construction and disposed over said springs, a pad disposed over said screen, and a cover means secured over said pad and secured to said frame means.

13. A seat construction as set forth in claim 12 wherein said cover means preloads said springs and said screen.

14. A seat construction as set forth in claim 12 wherein said cover means is detachable from frame means.

15. A seat construction as set forth in claim 12 wherein said cover means is secured to said frame means by the ends of said springs.

References Cited by the Examiner

UNITED STATES PATENTS

| 1,814,789 | 7/31 | Dorton | 297—456 |
| 1,879,724 | 9/32 | Wolpert | 297—320 |
| 2,311,145 | 2/43 | Widman | 297—456 |
| 2,530,924 | 11/50 | Turner | 297—455 |

FOREIGN PATENTS

| 6,906 | 3/10 | Great Britain. |
| 173,358 | 1/22 | Great Britain. |
| 683,188 | 2/30 | France. |
| 407,370 | 3/34 | Great Britain. |
| 1,021,894 | 2/53 | France. |

FRANK B. SHERRY, *Primary Examiner.*

CHANCELLOR E. HARRIS, *Examiner.*